United States Patent Office 2,950,309
Patented Aug. 23, 1960

2,950,309

AMPHETAMINE TANNATE

Chester John Cavallito, Decatur, Ill., assignor to Irwin, Neisler and Company, Decatur, Ill., a corporation of Illinois No Drawing. Filed Mar. 8, 1955, Ser. No. 493,061

3 Claims. (Cl. 260—473.5)

This invention relates to new organic compounds and is more particularly concerned with a novel salt of amphetamine having utility in the field of pharmaceutical preparations.

Amphetamine has been widely prescribed by physicians for its central stimulating and appetite depressant effects. However, it is undesirable that the amount of amphetamine in the blood stream be high enough to produce over-stimulation. At the same time, a relatively prolonged effective time of action is also desired. Generally, the sulphate or phosphate salts of amphetamine have been employed, but these salts give an initial peak stimulating effect followed by a rapid decline in blood level and resulting adverse responses, subsequently followed by rapid disappearance of any effect. To provide a slower adsorption rate and more prolonged blood level, it has been proposed that various special coatings be used which tend to increase the time before the particular tablet ingredients are available for assimilation. However, in practice, the special coatings merely prolong the difference between the time of administration and the time that the active ingredients begin the desired action. Where a method is used which employs a gel or other binding material, the result usually is that the active ingredient is dependent upon the absorption of gel prior to its being available for its original therapeutic purpose.

To overcome the above problem and present a pharmaceutical preparation which has a rather prolonged absorption period without "peak" stimulation, I have now provided a new organic salt, amphetamine tannate. Amphetamine tannate acid complex has a very limited solubility in water, but the salt dissolves so as to render it absorbable over an extended period when contacted with the contents of the gastrointestinal tract. This is in direct contrast with the other salts which have been suggested for this purpose as recited above. There are apparently no adverse side-reactions due to the tannate portion of the molecule. Thus, amphetamine tannate provides a material for central stimulation and appetite depressant effects having a prolonged period of effectiveness without peak stimulation.

Amphetamine, containing an asymmetric carbon, occurs in two optically active forms, the dextro and levo. Since the dextro is the only therapeutically active form, this invention contemplates that dextro or mixtures containing dextro and levo will be employed.

The following example is given to illustrate one method of preparing the novel product of the present invention, but is not to be construed as limiting.

Example

Approximately 75 grams of d-amphetamine as a free base was dissolved in 300 milliliters of isopropanol (solution A). Approximately 200 grams of NF tannic acid was dissolved in 700 milliliters of slightly warmed isopropanol (solution B). Solution B was poured, with rapid stirring, into solution A to provide an almost immediate precipitation of the insoluble tannate complex. The solution was cooled to room temperature and the product filtered off and dried. During the filtration, most of the isopropanol was removed by washing with acetone, and the precipitate dried at 140 degrees Fahrenheit to yield a light tan product. The amount of precipitate was approximately 200 grams of tannate salt but more could be obtained by concentration of the mother liquors.

Various modifications of the typical example given above may be made, as by substituting other solvents for the isopropanol, such as, for example, methyl, ethyl, n-propyl alcohols and mixtures of these alcohols with acetone, ether, benzene, toluene, xylene, et cetera. It is only required that the amphetamine and tannic acid be more soluble in the solvent than is the amphetamine tannate. While the temperature above shown for mixing is room temperature, it is to be understood that other temperatures such as in the range of from zero to 100 degrees centigrade may be employed with equal facility, depending upon the circumstances of the particular method which is employed.

Amphetamine tannate is readily assayed by the alkaline steam distillation method, or more conveniently by the acetous-perchloric acid titration for basic nitrogen. Theoretically, if tannic acid is all pure penta-(digalloyl)-glucose, and there was formed with the amphetamine an exactly 1:1 molar ratio in amphetamine to galloyl gallic acid moiety, the salt complex would have theoretically 28.4 percent amphetamine. Since amphetamine has a 10.3 percent nitrogen content, the pure tannate would have a theoretical nitrogen content of 2.93 percent. While the above example has shown a 1:1 molecular ratio of amphetamine to galloyl gallic acid moiety, a slight variance in tannic acid, such as between 25 and 35 percent, of the amphetamine, is satisfactory, and will not affect the use of the material in the manner as shown herein.

The term "tannic acid" as used herein, means N.F., or its equivalent, tannic acid. Since the molecular structure of all of the constituents of tannic acid have not been assuredly confirmed at this time, for the purpose of calculation it is assumed to be pure penta-(digalloyl)-glucose.

Various modifications may be made in the present invention without departing from the spirit or scope thereof and it is to be understood that I limit myself only as defined in the appended claims.

I claim:

1. Amphetamine tannate having a molecular ratio of approximately 1:1 amphetamine to galloyl gallic acid moiety.

2. d-Amphetamine tannate.

3. The process which comprises: mixing a solvent solution of amphetamine with a solvent solution of tannic acid and separating the amphetamine tannate thus-formed.

References Cited in the file of this patent

UNITED STATES PATENTS 2,399,742 Jones et al. _____ May 7, 1946
2,540,302 Stecher et al. _____ Feb. 6, 1951

OTHER REFERENCES

Biginelli: Chem. Abs. 2, 2813 (1908).
Rybak et al.: Chem. Abs. 43, 2668–9 (1949).
Yamanouchi: Chem. Abs. 47, 10006 (1953).